Figure 2:
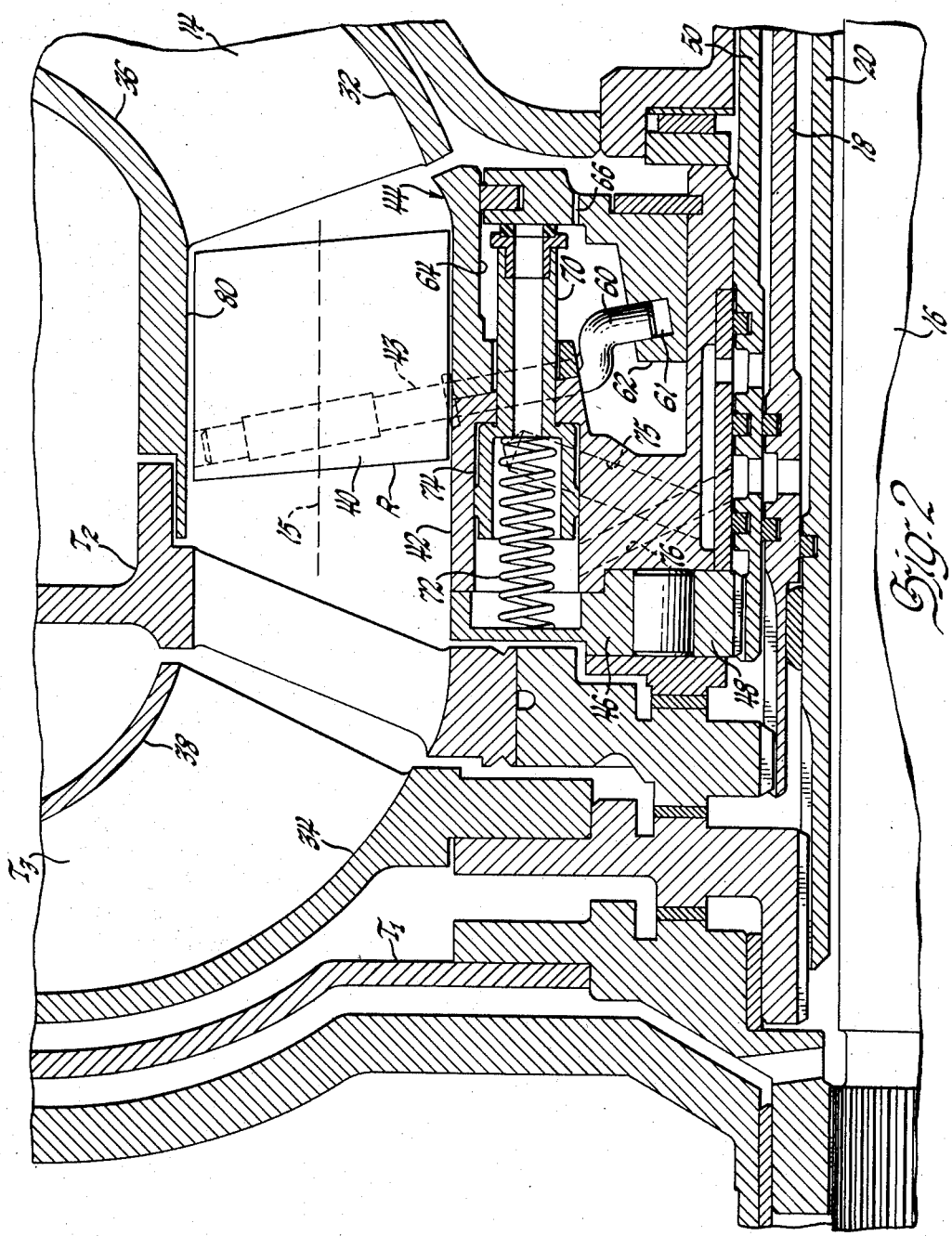

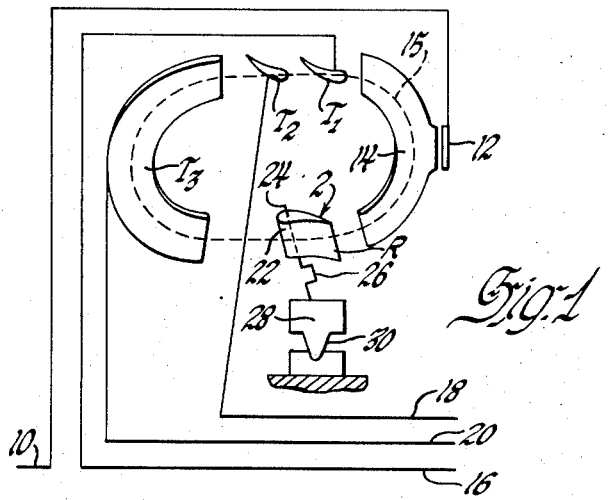
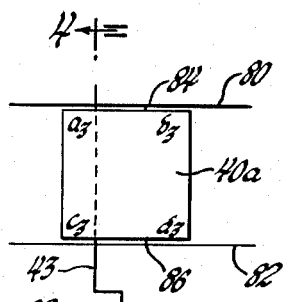
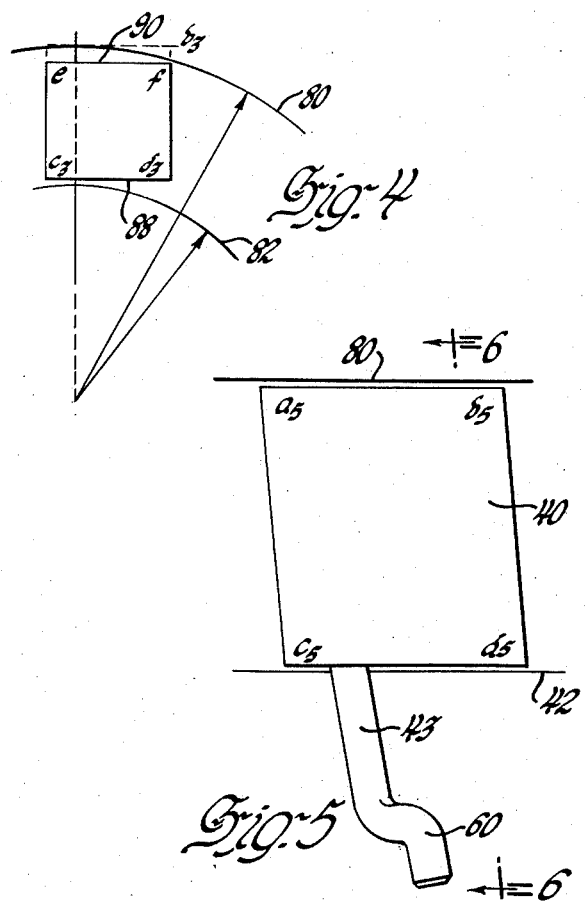
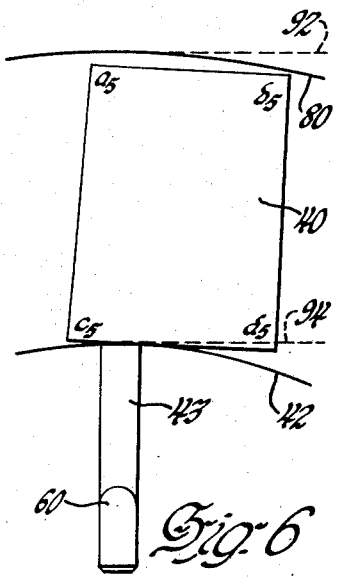

Aug. 11, 1959  O. K. KELLEY  2,898,740
TRANSMISSION
Filed May 22, 1958  2 Sheets-Sheet 2

INVENTOR.
Oliver K. Kelley
BY
T. R. Chisholm
ATTORNEY

United States Patent Office 2,898,740
Patented Aug. 11, 1959

2,898,740

TRANSMISSION

Oliver K. Kelley, Bloomfield Hills, Mich., assignor to General Motors Corporation, Detroit, Mich., a corporation of Delaware Application May 22, 1958, Serial No. 737,162

6 Claims. (Cl. 60—54)

This invention relates to hydrodynamic torque converters useful in transmissions of power trains, for example for driving automobiles.

It has been proposed to provide such torque converters with angularly adjustable reaction blades which can be positioned to influence the torque multiplication effected by the converter, for example as shown in British Patent 750,778 published June 20, 1956, the disclosure of which is incorporated herein by reference. Such devices that have come to my attention have been satisfactory within their inherent limitations, but have the disadvantage that the movable blades fit the adjacent toroidal flow-directing surfaces in only one position of adjustment. In other positions they leak and lose efficiency or fail to effect as high a torque multiplication as they could if they fitted the flow-directing surfaces in all positions of adjustment.

It has also been proposed to construct the generally toroidal flow directing surfaces as parts of concentric spheres and to form the blades with concentric circular edges which fit the flow-directing surfaces in all positions of adjustment. An example of such proposal is in the application for United States patent filed by me and Upton on July 11, 1957, Serial Number 671,166, the disclosure of which is incorporated herein by reference. This spherical structure has the disadvantage that the spherical surfaces inherently form humps which tend to cause flow losses.

This invention has among its objects to improve the efficiency of adjustable vane torque converters by increasing the effective flow of liquid in the desired direction through the reaction member, especially when the reaction blades are set in the position they occupy during the larger proportion of their use as reaction blades.

In the drawings:

Fig. 1 is a functional diagram of one-half of a symmetrical longitudinal section of a torque converter embodying one form of the invention, Fig. 2 is a half-section corresponding to Fig. 1 showing the actual structure of a reaction element and its adjusting mechanism.

Fig. 3 is one-half of a symmetrical schematic axial section through the reaction member when the blades are set for low torque multiplication in one form of torque converter, Fig. 4 is schematic section corresponding to a section on the line 4—4 of Figure. 3, but with the blades set for high torque multiplication, Fig. 5 is a schematic half of a symmetrical axial section through a torque converter embodying the invention, having its blades set at low angle corresponding to Fig. 3, and Fig. 6 is a section corresponding to a section on the line 6—6 of Fig. 5 but with the blade set at high angle.

As shown in Fig. 1, the torque converter may include an input shaft 10 which can be connected by a clutch 12 to rotate an impeller 14 of known form about the axis of the input shaft. The impeller circulates liquid such as oil in a generally toroidal path represented by the line 15 successively through turbines of known form such as $T_1$, $T_2$, and $T_3$ from which the oil returns to the impeller through a reaction member or stator R which changes the direction of the oil entering the impeller in order to multiply torque, as is known. The turbines are connected to any suitable coaxial output shafts 16, 18 and 20. The reaction member R has a number of blades 22 each of which is mounted on a pivot or shaft 24 having a crank arm 26 by which the blades may be adjusted to vary the amount by which they change the direction of oil flowing from the turbine $T_3$ to the impeller. The entire reaction assembly is mounted on a hub 28 which is rotatable forward about the axis of the shafts 16, 18, 20. Reverse rotation is prevented by a one-way brake 30. As so far described, the structure and arrangement are known.

Referring to Fig. 2, the impeller and turbines each have an outer shell and an inner shroud, such as the outer shells 32 and 34 of the impeller and of turbine $T_3$ and the inner shrouds 36 and 38. The shells and shrouds of the various members define a toroidal circuit for working liquid, and the circuit passes through the reaction member. The shell 32 is referred to as the radially outer flow-directing surface of the turbine and the shroud 36 as the radially inner flow-directing surface because their traces are radially outermost and radially innermost with respect to the center of the section of the toroidal flow path shown in Fig. 1.

The reaction member, guide wheel or stator includes, for example, reaction blades 40 of known form disposed between inner and outer guide surfaces which may be an extension of the inner guide surface 36 of the impeller and an outer guide surface 42. Each blade is rigidly secured to a shaft 43 journalled in a stator body designated as a whole by 44 which is bolted to an outer race 46 of a known form of freewheeler which can rotate forward but not backward with respect to a fixed inner race 48 splined to a ground sleeve 50 fixed to the casing of the transmission. Each of the shafts 43 has a crank arm 60 disposed in an annular groove 61 in an annular piston 62 which is an adjusting element for the blades. The piston slides in a suitable annular cylinder 64 formed in the body 44. The converter is constantly charged with liquid under pressure by any suitable means and the pressure of the converter constantly urges the piston toward the left as Fig. 1 is seen. This urges the blades to turn across the path of oil flowing from the turbine $T_3$ to the impeller 14, to a position in which they change the direction of the oil through a larger angle than when the blades are more nearly parallel to the axis of the transmission. When the piston 62 is as far to the left as it will go the blades are at the highest angle, which is a high performance position effecting a high range of torque multiplication.

Oil from the converter is constantly fed to the cylinder 64 at a restricted rate of flow through a small orifice 66 in the piston 62, and the piston is held in any desired position so as to hold the blades at any desired angle by venting the cylinder 64 through a movable vent pipe 70, closable by the piston 62 and positioned by the resultant of the forces of spring 72 and controlled pressure admitted to a cylinder 74 through a duct 75 connected to the space between sleeves 50 and 18. The pressure in chamber 74 determines the position of the vent pipe 70.

Whenever the chamber 64 is vented by the duct 76 connected to the space between shafts 18 and 20 the pressure in the converter can force oil from chamber 64 and through the vent and move the piston to the left to increase the angle of the blades until the piston closes the end of tube 70. This stops further flow of oil from the chamber 64. This holds the piston against the tube 70 and determines the angular position of the blades.

One of the objects of the invention is to increase the effectiveness of the stator in increasing the torque ratio and to avoid reducing the rate of increase of torque ratio as the angle of the blades is increased. Therefore, a feature of the construction of the reaction member in this transmission is the arrangement of the blades with respect to the flow-defining surfaces 36 and 44 of the reaction member to reduce the gaps between the ends of the stator blades 40 and the surfaces 36 and 44 which direct or confine the oil flow between the third turbine $T_3$ and the impeller 14. This is diagrammatically illustrated in Figs. 3 to 6.

It is customary to provide an inner substantially cylindrical wall 80 and an outer substantially cylindrical wall 82 which together form an annular passage for the oil flowing from the turbine to the impeller. These walls correspond functionally to the surfaces 36 and 44 respectively in Fig. 2. Fig. 3 is a schematic section taken as Fig. 2 is taken showing diagrammatically the relationship between the walls 80 and 82 and a projection 40a on an axial plane of a theoretical stator blade corresponding to a blade 40. In this view the traces of the surfaces 80 and 82 are straight lines. If the top edge $a3$—$b3$ of the projection 40a of the stator blade and the bottom edge $c3$—$d3$ are straight parallel lines, then when the principal plane of the stator blade is parallel to the axis of the transmission there will be a clearance 84 between the inner or top edge of the stator blade and the wall 80 and a clearance 86 between the bottom edge of the stator blade and the wall 82. These clearances will be substantially constant through the length of the stator blade, and in practice can be made small.

Fig. 4 is a transverse or radial section on the line 4—4 of Fig. 3 showing the traces of the walls 80 and 82 as circles. From this it is apparent that the blade shown in Fig. 3 will be too wide radially to be turned parallel, or even nearly parallel to the trace of the transverse plane through the section line 4—4 because the corner $b3$ would strike the wall 80. Consequently, in order to permit turning the blade through any substantial angle, the blade must be shorter than in Fig. 3 as represented by a square $c3, d3, f, e$. Where the blade is so shortened it not only has a smaller effective area than the blade shown in Fig. 3, but there is a large gap or clearance 88 between the corner $d3$ and the wall 82 and there is also a gap 90 between the wall 80 and the center of the upper edge of the blade. These clearances further reduce the effectiveness of the stator in changing the direction of oil and thus reduce the effectiveness of the torque converter in multiplying torque. As the blade is turned to increase the torque multiplication of the torque converter the gaps reduce the rate of increase of torque.

In my invention the above described disadvantages are reduced by constructing and arranging the stator blades, as shown diagrammatically in Figs. 5 and 6 and as shown structurally in Fig. 1. The portion 80 of the inner shroud 36 and the surface 42 are formed as cylinders concentric with the axis of rotation of the torque converter in order to offer the least possible resistance to flow from the turbine $T_3$ to the impeller 14. The upper edge $a5$, $b5$ and the lower edge $c5$, $d5$ of each blade are as nearly as possible parallel to the cylindrical surfaces 80 and 42 when the general direction of each blade is parallel to the axis of the transmission. This is nearly, or even exactly, the position the blades take when effecting low torque multiplication and this is the position they occupy most of the time, since high torque multiplication positions (more nearly transverse to the axis) is used only during periods of high torque demand. Consequently, during most of the operation of the torque converter the stator blades have minimum clearance from the walls 80 and 42 and so operate as effectively as possible.

In order to prevent, as far as possible, the condition shown in Fig. 4, the pivot shafts 43 are inclined as shown in Fig. 2. The axis of each shaft is in a plane which includes the axis of rotation of the torque converter as a whole, namely the axis of the central shaft 16. In the case of the particular shaft shown in Fig. 2 this plane is the plane of the paper. It will be appreciated that there are a number of shafts 43 and blades 40 arranged radially around the circumference of the stator. Within this plane the shaft 43 is inclined forwardly from the outer guide surface 44 toward the turbine $T_3$ so that the shaft is inclined with respect to the flow direction of liquid represented by the line 15 in Figs. 1 and 2, that is, it is inclined with respect to those planes which are tangent to the cylindrical surfaces 44 and 80 at the points the axis of the shaft 43 intersects these cylindrical surfaces. The result of this inclination is that as the shaft is rotated to position the blade transverse to the principal axis of the transmission the points $b5$, and $d5$ move closer to the axis of the shaft 16, as shown in Fig. 6. This allows the corner $b5$ to recede from the line 92, which is the trace of a plane tangent to the guide surface 80 at the point where the axis of the shaft 43 intersects the surface 80. This dropping away allows the corner $b5$ to clear the surface 80 and permits the blade 40 to be turned transverse to the direction of flow of the liquid which is to say transverse to the principal axis of the transmission. Likewise, the corner $d5$ recedes from the line 94 which represents a plane tangent to the surface 42 at the point where the axis of the shaft 43 intersects the surface 42. In doing this the corner $d5$ approaches the surface 42 so that the clearance between the surface 42 and the edge $c5$, $d5$ of the blade is reduced. Thus the inclination of the pivots both permits the blade 40 to be turned to a higher angle and the clearance between the blade and the guide surface 42 and 80 is reduced compared to the condition that would exist if the spindle 43 were perpendicular to the planes tangent to the surfaces 80 and 64, which latter is the condition in adjustable blade stators heretofore known.

I claim:

1. In a hydrodynamic torque converter having an impeller rotatable about an axis for transmitting torque to a coaxial turbine rotor through circulating fluid, the combination of a radially outer flow directing surface and a radially inner flow directing surface associated with each of said rotors defining a toroidal path for the liquid through said rotors and from each of said rotors to the other, and a reaction element between the outlet of the turbine and the inlet of the impeller and including angularly adjustable reaction blades disposed between radially inner and radially outer flow directing reaction surfaces which confine the circulating liquid to said toroidal path from the turbine to the impeller, said flow directing reaction surfaces being parts of surfaces of concentric cylinders coaxial with said impeller, each reaction blade being rotatable on an axis which lies in a plane containing the axis of rotation of the turbine and which is inclined to a plane tangent to one of the cylindrical surfaces at the point where the blade axis intersects said cylindrical surface.

2. In a hydrodynamic torque converter having an impeller rotatable about an axis for transmitting torque to a coaxial turbine rotor through circulating fluid, the combination of a radially outer flow directing surface and a radially inner flow directing surface associated with each of said rotors defining a toroidal path for the liquid through said rotors and from each of said rotors to the other, and a reaction element between the outlet of the turbine and the inlet of the impeller and including angularly adjustable reaction blades disposed between radially inner and radially outer flow directing reaction surfaces which confine the circulating liquid to said toroidal path from the turbine to the impeller, said flow directing reaction surfaces being parts of surfaces of concentric cylinders coaxial with said impeller, each reaction blade being rotatable on an axis which lies in a plane containing the axis of rotation of the turbine and which is inclined to a plane tangent to one of the cylindrical surfaces at the point where the blade axis intersects said cylindrical surface, and each blade having edges which in one angular position of said blade are substantially parallel to the traces of said cylindrical surfaces in a plane determined by the axis of the turbine and the axis of rotation of the blade.

3. In a hydrodynamic torque converter having an impeller rotatable about an axis for transmitting torque to a coaxial turbine rotor through circulating fluid, the combination of a radially outer flow directing surface and a radially inner flow directing surface associated with each of said rotors defining a toroidal path for the liquid through said rotors and from each of said rotors to the other, and a reaction element between the outlet of the turbine and the inlet of the impeller and including angularly adjustable reaction blades disposed between radially inner and radially outer flow directing reaction surfaces which confine the circulating liquid to said toroidal path from the turbine to the impeller, said flow directing reaction surfaces being parts of surfaces of concentric cylinders coaxial with said impeller, each reaction blade being rotatable on an axis which lies in a plane containing the axis of rotation of the turbine and which is inclined to a plane tangent to one of the cylindrical surfaces at the point where the blade axis intersects said cylindrical surface, and means for simultaneously rotating all the blades about their axes.

4. In a hydrodynamic torque converter having an impeller rotatable about an axis for transmitting torque to a coaxial turbine rotor through circulating fluid, the combination of a radially outer flow directing surface and a radially inner flow directing surface associated with each of said rotors defining a toroidal path for the liquid through said rotors and from each of said rotors to the other, and a reaction element between the outlet of the turbine and the inlet of the impeller and including angularly adjustable reaction blades disposed between radially inner and radially outer flow directing reaction surfaces which confine the circulating liquid to said toroidal path from the turbine to the impeller, said flow directing reaction surfaces being parts of surfaces of concentric cylinders coaxial with said impeller, each reaction blade being fixed to a shaft rotatable on an axis which lies in a plane containing the axis of rotation of the turbine and which is inclined to a plane tangent to one of the cylindrical surfaces at the point where the blade axis intersects said cylindrical surface.

5. In a hydrodynamic torque converter having an impeller rotatable about an axis for transmitting torque to a coaxial turbine rotor through circulating fluid, the combination of a radially outer flow directing surface and a radially inner flow directing surface associated with each of said rotors defining a toroidal path for the liquid through said rotors and from each of said rotors to the other, and a reaction element between the outlet of the turbine and the inlet of the impeller and including angularly adjustable reaction blades disposed between radially inner and radially outer flow directing reaction surfaces which confine the circulating liquid to said toroidal path from the turbine to the impeller, said flow directing reaction surfaces being parts of surfaces of concentric cylinders coaxial with said impeller, each reaction blade being rotatable on an axis which lies in a plane containing the axis of rotation of the turbine and which is inclined to a plane tangent to one of the cylindrical surfaces at the point where the blade axis intersects said cylindrical surface and inclined forwardly from the axis of the impeller toward said turbine.

6. In a hydrodynamic torque converter having an impeller rotatable about an axis for transmitting torque to a coaxial turbine rotor through circulating fluid, the combination of a radially outer flow directing surface and a radially inner flow directing surface associated with each of said rotors defining a toroidal path for the liquid through said rotors and from each of said rotors to the other, and a reaction element between the outlet of the turbine and the inlet of the impeller and including angularly adjustable reaction blades disposed between radially inner and radially outer flow directing reaction surfaces which confine the circulating liquid to said toroidal path from the turbine to the impeller, said flow directing reaction surfaces being parts of surfaces of concentric cylinders coaxial with said impeller, each reaction blade being rotatable on an axis which lies in a plane containing the axis of rotation of the turbine and which is inclined to a plane tangent to one of the cylindrical surfaces at the point where the blade axis intersects said cylindrical surface and each blade having edges which in one angular position of said blade are substantially parallel to the axis of the impeller.

No references cited.